(12) United States Patent
Oelerich

(10) Patent No.: US 7,896,023 B2
(45) Date of Patent: Mar. 1, 2011

(54) FUEL LEAKAGE VENT FOR FUEL SOURCE AND VALVE INTERFACE

(75) Inventor: Wolfgang Oelerich, Mainz-Kastel (DE)

(73) Assignee: GM Global Technology Operations LLC, Detroit, MI (US)

( * ) Notice: Subject to any disclaimer, the term of this patent is extended or adjusted under 35 U.S.C. 154(b) by 708 days.

(21) Appl. No.: 11/778,759

(22) Filed: Jul. 17, 2007

(65) Prior Publication Data

US 2009/0020165 A1    Jan. 22, 2009

(51) Int. Cl.
*F16K 5/08* (2006.01)
(52) U.S. Cl. .................................................. 137/312
(58) Field of Classification Search ............... 137/312, 137/613
See application file for complete search history.

(56) References Cited

U.S. PATENT DOCUMENTS

| 3,563,508 | A | * | 2/1971 | DeLorenzo | 251/324 |
| 4,022,236 | A | * | 5/1977 | Dumont et al. | 137/312 |
| 5,074,519 | A | * | 12/1991 | Pettus | 251/14 |
| 5,316,871 | A |   | 5/1994 | Swathirajan et al. | |
| 6,431,197 | B2 | * | 8/2002 | Hintzman et al. | 137/613 |
| 6,725,876 | B2 | * | 4/2004 | Bowman et al. | 137/312 |
| 2004/0209150 | A1 |   | 10/2004 | Rock et al. | |

FOREIGN PATENT DOCUMENTS

WO    WO 2006/082765 A1    8/2006

* cited by examiner

*Primary Examiner*—Kevin L Lee
(74) *Attorney, Agent, or Firm*—Fraser Clemens Martin & Miller LLC; J. Douglas Miller

(57) ABSTRACT

A fuel leakage vent is disclosed, wherein the fuel leakage vent is formed in a fuel source and valve interface to militate against an accumulation of fuel in a tank compartment.

15 Claims, 2 Drawing Sheets

US 7,896,023 B2

FUEL LEAKAGE VENT FOR FUEL SOURCE AND VALVE INTERFACE

FIELD OF THE INVENTION

The present invention relates generally to a vent system and more particularly to a fuel leakage vent for venting an interface between a fuel source and a valve.

BACKGROUND OF THE INVENTION

A fuel cell system is increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

The basic process employed by a fuel cell is efficient, substantially pollution-free, quiet, free from moving parts (other than an air compressor, cooling fans, pumps and actuators), and may be constructed to yield only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Fuel cells are electrochemical devices which directly combine a fuel such as hydrogen and an oxidant such as oxygen to produce electricity. The fuel is typically supplied from a fuel source such as a high pressured storage vessel or tank. The oxidant is typically supplied by an air stream.

The fuel source may communicate with a shut-off device such as a shut-off valve, for example. The fuel source and valve interface is typically designed such that a female thread formed on the fuel source mates with a corresponding male counter part formed on the valve for structural integration. A face type seal or a radial type seal such as an O-ring, for example, is typically disposed between the female thread and the male member to create a substantially fluid tight seal therebetween. However, the seals do not completely seal the fuel source/valve interface, as a portion of the fuel may leak past the seal. Accordingly, it is desirable to control leakage of fuel to militate against the accumulation of the fuel in a tank compartment which houses the fuel source and the valve.

It would be desirable to produce a fuel leakage vent for use with a fuel source and valve interface in a fuel cell system, wherein a fuel is directed to a desired location and an accumulation of the fuel in a tank compartment is mitigated.

SUMMARY OF THE INVENTION

Harmonious with the present invention, a fuel leakage vent for use with a fuel source and valve interface in a fuel cell system, wherein a fuel is directed to a desired location and an accumulation of the fuel in a tank compartment is mitigated, has surprisingly been discovered.

In one embodiment, a fuel source and valve interface comprises: a fuel source; a valve in fluid communication with the fuel source; and a fuel leakage vent formed in at least one of a wall of the fuel source and the valve to provide fluid communication between the fuel source and a desired fuel distribution area.

In another embodiment, a valve comprises: a hollow main body in fluid communication with a fuel source; and a fuel leakage vent formed in the valve, the fuel leakage vent providing fluid communication between the fuel source and a desired fuel distribution area, wherein a pressure within the fuel source is higher than a pressure of the desired fuel distribution area.

In another embodiment, a fuel source and valve interface comprises: a fuel source; a valve in fluid communication with the fuel source; a fuel leakage vent formed in at least one of a wall of the fuel source and the valve, the fuel leakage vent adapted to communicate with a desired fuel distribution area, wherein a pressure within the fuel source is higher than a pressure of the desired fuel distribution area; and a first sealing structure disposed between the fuel source and the valve.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
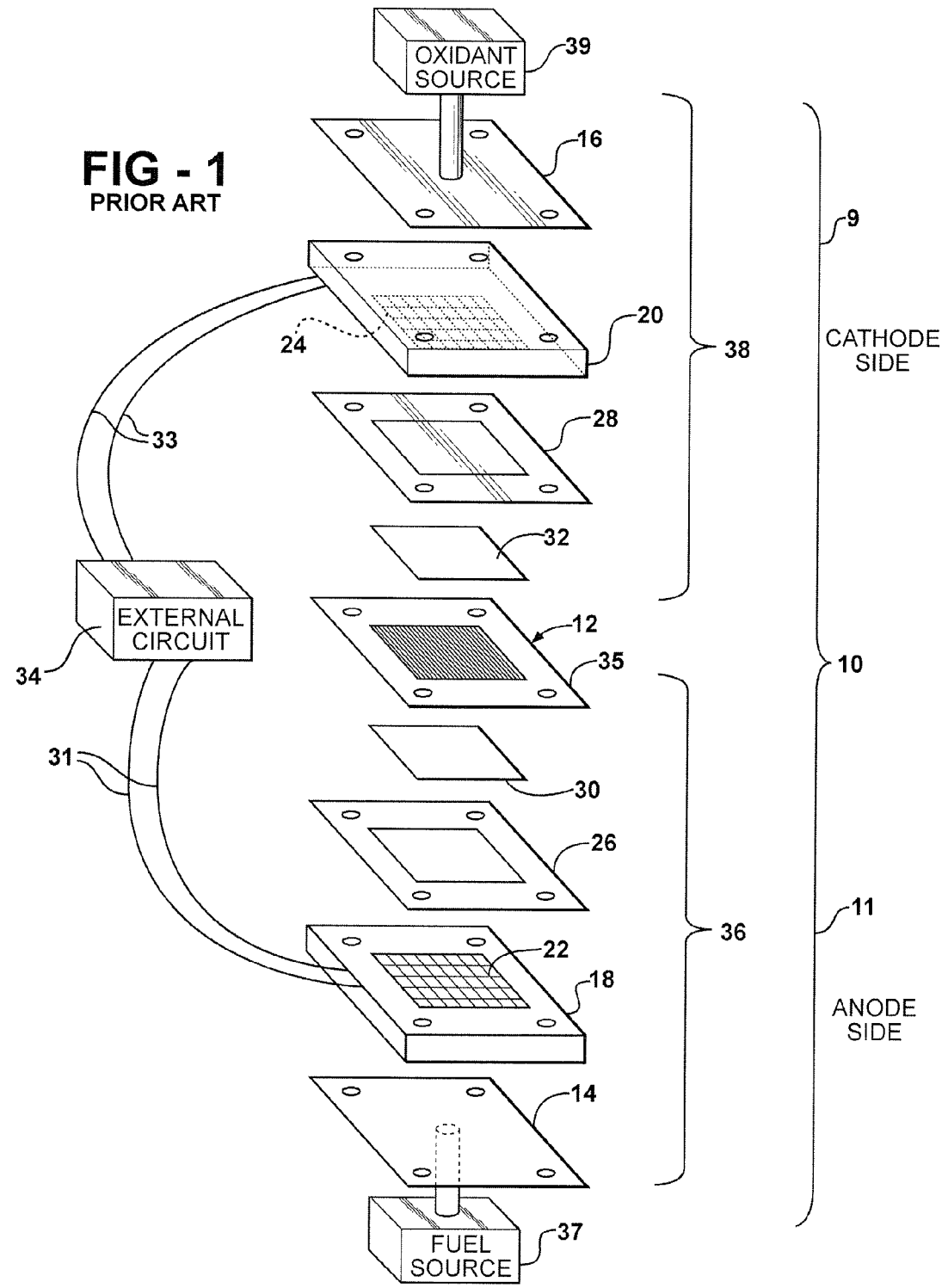
FIG. 1 is an exploded perspective view of a fuel cell system according to the prior art.

FIG. 1 shows a fuel cell 10 having a cathode side 9 and an anode side 11. The fuel cell 10 is in fluid communication with a fuel source 37 and an oxidant source 39. Graphite blocks 18, 20 having a plurality of openings 22, 24 respectively formed therein to facilitate fluid distribution are disposed adjacent insulation end plates 14, 16. It is understood that electrically conductive electrode plates (not shown) can be used in the place of the graphite blocks 18, 20 as desired. Gaskets 26, 28 and gas diffusion media (GDM) 30, 32, such as carbon fiber paper, for example, having respective anode and cathode connections 31, 33, are respectively disposed between a membrane electrode assembly (MEA) 12 and the graphite blocks 18, 20. An oxidant and current transport means 36 is made up of the graphite block 18, the gasket 26, and the GDM 30. A fuel and current transport means 38 is made up of the graphite block 20, the gasket 28, and the GDM 32. The anode connection 31 and the cathode connection 33 interconnect the fuel cell 10 with an external circuit 34, and may include other fuel cells (not shown) as desired.

A fuel cell stack (not shown) is constructed of a plurality of fuel cells 10 connected in series. Once a desired number of fuel cells 10 are joined together to form the fuel cell stack, a coolant system (not shown) is provided to cool the fuel cell stack. The illustrative fuel cell stack described herein is commonly used as a power plant for the generation of electric power in a vehicle, for example.

In use, a fuel such as hydrogen, for example, is supplied from the fuel source 37 and an oxidant such as oxygen, for example, is supplied from the oxidant source 39. The fuel and oxidant from respective sources 37, 39 diffuse through respective fluid and current transport means 36, 38 to opposing sides of the MEA 12. Porous electrodes (not shown) form an anode (not shown) at the anode side 11 and a cathode (not shown) at the cathode side 9, and are separated by a proton exchange membrane (PEM) 35 The PEM 35 provides for ion transport to facilitate a chemical reaction in the fuel cell 10. Typically, the PEM 35 is produced from copolymers of suitable monomers. Such proton exchange membranes may be characterized by monomers of the structures:

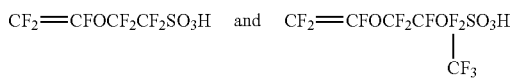

Such a monomer structure is disclosed in detail in U.S. Pat. No. 5,316,871 to Swarthirajan et al, incorporated herein by reference in its entirety.

Figure 2:
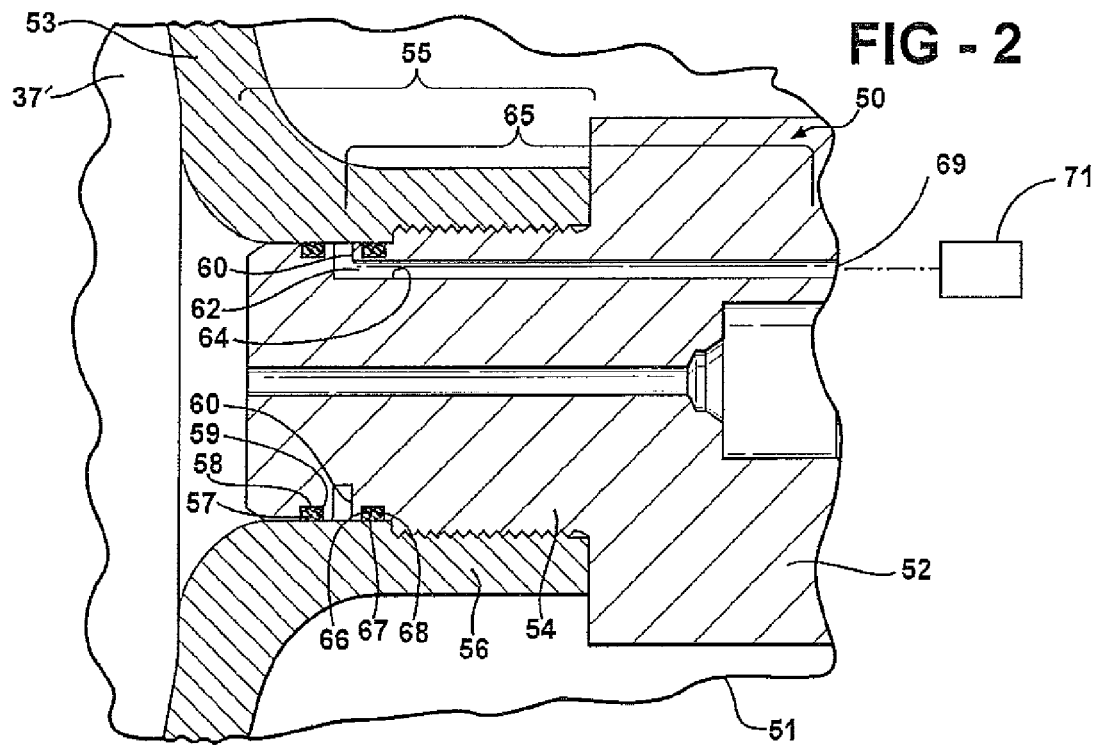
FIG. 2 is a fragmentary sectional view of a fuel source and valve interface in accordance with an embodiment of the invention.

A valve 50 according to an embodiment of the invention is disposed in an enclosed tank compartment 51 as shown in FIG. 2, wherein similar structure previously described in FIG. 1 includes the same reference numeral followed by a prime (') symbol. The valve 50 includes a main body 52 and an axially extending hollow, threaded male member 54 that is received in a threaded female member 56 formed on a wall 53 of a fuel source 37'. An interface between the male member 54 and the female member 56 is referred to as a fuel source and valve interface 55. It is understood that the female member 56 can be formed separately from the wall 53 of the fuel source 37' as desired without departing from the scope and spirit of the invention, such as wherein the female member 56 is affixed to the wall 53, for example. It is also understood that the valve 50 may include a female member (not shown) wherein the wall 53 of the fuel source 37' would include a corresponding male member (not shown) as desired.

A first sealing structure 57, such as an O-ring, for example, is disposed between the male member 54 and the female member 56 in a first annular channel 58 formed in the male member 54. Optionally, a first back-up sealing structure 59 is disposed in the first annular channel 58 adjacent the first sealing structure 57.

The male member 54 of the valve 50 includes an annular groove 60 that is in fluid communication with a first end 62 of a bore 64 that extends axially through the male member 54 and the main body 52 of the valve 50. It is understood that the annular groove 60 can be formed in the female member 56 as desired. The annular groove 60 and the bore 64 are collectively referred to as a fuel leakage vent 65. A second end 69 of the bore 64 is in fluid communication with a desired fuel distribution area 71, such as a vent passageway in communication with the atmosphere or a burner, for example. It is understood that the second end 69 of the bore 64 can be in communication with other structure (not shown) as desired, such as a hollow tube, for example, wherein the fuel flows through the hollow tube to the desired fuel distribution area 71 as desired.

Optionally, a second sealing structure 66 such as an O-ring, for example may be disposed between the male member 54 of the valve 50 and the female member 56. The second sealing structure 66 is disposed in a second annular channel 67 formed in the male member 54 on a side of the annular groove 60 opposite the first annular channel 58. Additionally, a second back-up sealing structure 68 may be disposed in the second annular channel 67 adjacent the second sealing structure 66.

In use, the valve 50 is opened and closed to selectively permit and militate against a flow of fuel through the valve 50 from the fuel source 37' to a fuel cell stack (not shown). A controller (not shown), for example, can be used to send an appropriate signal to open and close the valve 50 based on a fuel requirement of the fuel cell stack, for example. As the fuel is supplied from the fuel source 37' to the fuel cell stack, an amount of fuel may leak through the seal created by the first sealing structure 57 and the first back-up sealing structure 59. It is understood that an amount of fuel may also leak through the substantially fluid tight seal created by the first sealing structure 57 and the first back-up sealing structure 59 when the valve 50 is in a closed position. A pressure difference between a high pressure within the fuel source 37' and a low pressure of the desired fluid distribution area 71 causes the fuel to flow into the annular groove 60 formed in the male member 54 of the valve 50 toward the desired fuel distribution area 71. Thereafter, the fuel flows through the bore 64 formed in the valve 50, out of the second end 69 thereof, and to the desired fuel distribution area 71.

The second sealing structure 66 and the second back-up sealing structure 68 militate against the flow of the fuel therethrough into the tank compartment 51. Accordingly, a leakage of fuel into the tank compartment 51 is minimized. Optionally, a sensor (not shown) may be included on a side of the second back up ring 68 opposite the first annular channel 58 and the annular groove 60. The sensor could sense an amount of fuel flowing into the tank compartment 51, and could be configured to send a signal to an appropriate output device (not shown) such as an indicator light, for example, if the amount of fuel flowing into the tank compartment 51 were to reach a predetermined level.

Use of the fuel leakage vent 65 with the fuel source and valve interface 55 minimizes an amount of fuel permitted to leak into the tank compartment 51. Accordingly, an accumulation of fuel in the tank compartment 51 is mitigated.

Figure 3:
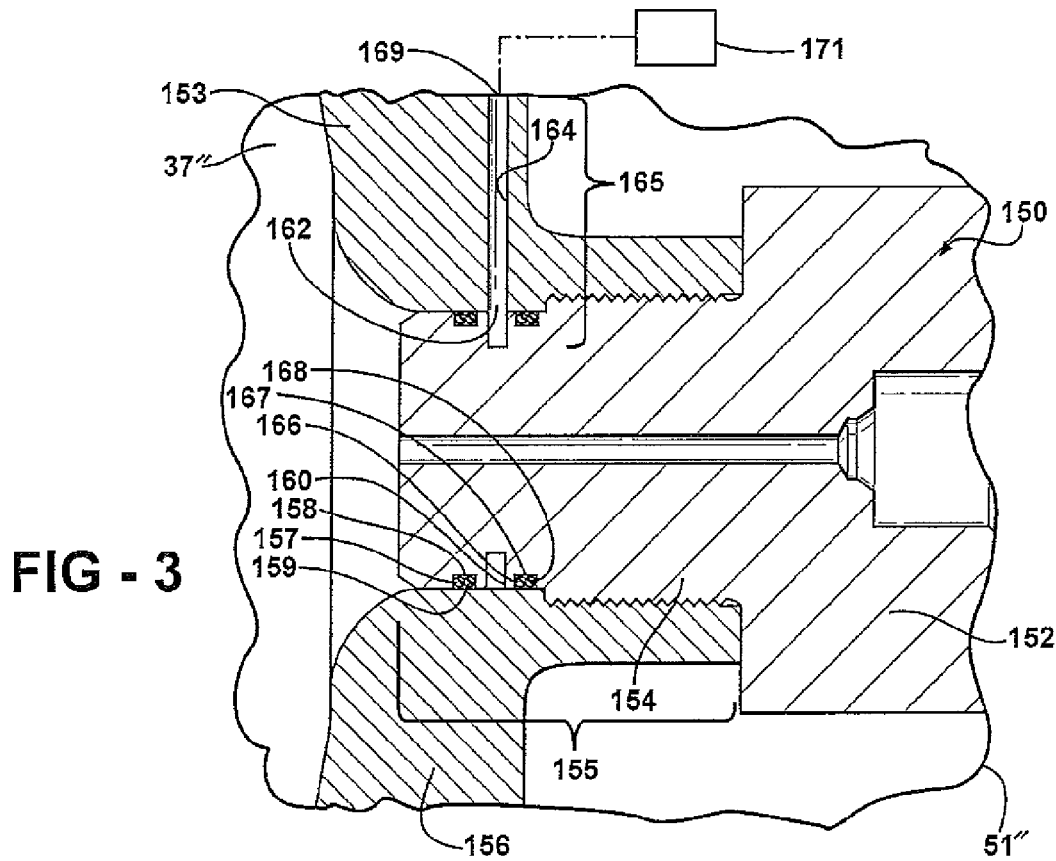
FIG. 3 is a fragmentary sectional view of a fuel source and valve interface in accordance with another embodiment of the invention.

FIG. 3 shows a valve 150 disposed in a tank compartment 51" in accordance with another embodiment of the invention, wherein similar structure previously described in FIG. 1 or 2 includes the same reference numeral followed by a double prime (") symbol. The valve 150 includes a main body 152 and an axially extending hollow, threaded male member 154 that is received in a threaded female member 156 formed on a wall 153 of a fuel source 37". An interface between the male member 154 and the female member 156 is referred to as a fuel source and valve interface 155. It is understood that the female member 156 can be formed separately from the wall 153 of the fuel source 37" as desired without departing from the scope and spirit of the invention, such as wherein the female member 156 is affixed to the wall 153, for example. It is also understood that the valve 150 may include a female member (not shown) wherein the wall 153 of the fuel source 37" would include a corresponding male member (not shown) as desired.

A first sealing structure 157, such as an O-ring, for example, is disposed between the male member 154 and the female member 156 in a first annular channel 158 formed in the male member 154. Optionally, a first back-up sealing structure 159 is disposed in the first annular channel 158 adjacent the first sealing structure 157.

The male member 154 of the valve 150 includes an annular groove 160 that is in fluid communication with a first end 162 of a bore 164 that extends through the female member 156 and the wall 153 of the fuel source 37". It is understood that the annular groove 160 can be formed in the male member 154 as desired. The annular groove 160 and the bore 164 are collectively referred to as a fuel leakage vent 165. A second end 169 of the bore 164 is in fluid communication with a desired fuel distribution area 171, such as a vent passageway in communication with the atmosphere or a burner, for example. It is understood that the second end 169 of the bore 164 can be in communication with other structure (not shown) as desired, such as a hollow tube, for example, wherein the fuel flows through the hollow tube to the desired fuel distribution area 171 as desired.

Optionally, a second sealing structure 166 such as an O-ring, for example may be disposed between the male member 154 of the valve 150 and the female member 156. The second sealing structure 166 is disposed in a second annular channel 167 formed in the male member 154 on a side of the annular groove 160 opposite the first annular channel 158. Additionally, a second back-up sealing structure 168 may be disposed in the second annular channel 167 adjacent the second sealing structure 166.

In use, the valve 150 is opened and closed to selectively permit and militate against a flow of fuel through the valve 150 from the fuel source 37" to a fuel cell stack (not shown). A controller (not shown), for example, can be used to send an appropriate signal to open and close the valve 150 based on a fuel requirement of the fuel cell stack, for example. As the fuel is supplied from the fuel source 37" to the fuel cell stack, an amount of fuel may leak through the seal created by the first sealing structure 157 and the first back-up sealing structure 159. It is understood that an amount of fuel may also leak through the substantially fluid tight seal created by the first sealing structure 157 and the first back-up sealing structure 159 when the valve 150 is in a closed position. A pressure difference between a high pressure within the fuel source 37" and a low pressure of the desired fluid distribution area 171 causes the fuel to flow into the annular groove 160 formed in the male member 154 of the valve 150 toward the desired fuel distribution area 171. Thereafter, the fuel flows through the bore 164 formed in female member 156 and the wall 153 of the fuel source 37", out of the second end 69 of the bore 164, and to the desired fuel distribution area 171.

The second sealing structure 166 and the second back-up sealing structure 168 militate against the flow of the fuel therethrough into the tank compartment 51". Accordingly, a leakage of fuel into the tank compartment 51" is minimized. Optionally, a sensor (not shown) may be included on a side of the second back up ring 168 opposite the first annular channel 158 and the annular groove 160. The sensor could sense an amount of fuel flowing into the tank compartment 51", and could be configured to send a signal to an appropriate output device (not shown) such as an indicator light, for example, if the amount of fuel flowing into the tank compartment 51" were to reach a predetermined level.

Use of the fuel leakage vent 165 with the fuel source and valve interface 155 minimizes an amount of fuel permitted to leak into the tank compartment 51". Accordingly, an accumulation of fuel in the tank compartment 51" is mitigated.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel source and valve interface comprising:
a fuel source;
a main body of a valve in fluid communication with the fuel source; and
a fuel leakage vent formed in a wall of the fuel source to provide fluid communication between the fuel source and a desired fuel distribution area, wherein at least a portion of the fuel leakage vent is formed in the main body of the valve.

2. The interface according to claim 1, wherein a pressure within the fuel source is higher than a pressure of the desired fuel distribution area.

3. A fuel source and valve interface comprising:
a fuel source;
a main body of a valve in fluid communication with the fuel source; and
a fuel leakage vent formed in a wall of the fuel source to provide fluid communication between the fuel source and a desired fuel distribution area, wherein the fuel source includes a female member that receives a corresponding male member of the main body of the valve.

4. A fuel source and valve interface comprising:
a fuel source;
a main body of a valve in fluid communication with the fuel source; and
a fuel leakage vent formed in a wall of the fuel source to provide fluid communication between the fuel source and a desired fuel distribution area, further comprising a first sealing structure disposed between the fuel source and the main body of the valve.

5. The interface according to claim 4, further comprising a second sealing structure disposed between the fuel source and the main body of the valve.

6. The interface according to claim 5, further comprising a first back-up sealing structure disposed adjacent the first sealing structure.

7. The interface according to claim 6, further comprising a second back-up sealing structure disposed adjacent the second sealing structure.

8. A fuel source and valve interface comprising:
a hollow main body of a valve in fluid communication with a fuel source; and
a fuel leakage vent formed in the main body of the valve, the fuel leakage vent providing fluid communication between the fuel source and a desired fuel distribution area, wherein a pressure within the fuel source is higher than a pressure of the desired fuel distribution area;
a first sealing structure disposed between the fuel source and the main body of the valve; and
a first back-up sealing structure disposed adjacent the first sealing structure.

9. The interface according to claim 8, wherein at least a portion of the fuel leakage vent is formed in a wall of the fuel source.

10. The interface according to claim 8, further comprising a second sealing structure disposed between the fuel source and the main body of the valve.

11. The interface according to claim 10, further comprising a second back-up ring disposed adjacent the second sealing structure.

12. A fuel source and valve interface comprising:
a high pressure storage vessel;
a main body of a valve in fluid communication with the high pressure storage vessel;
a fuel leakage vent formed in a wall of the high pressure storage vessel, the fuel leakage vent adapted to communicate with a desired fuel distribution area, wherein a pressure within the high pressure storage vessel is higher than a pressure of the desired fuel distribution area; and a first sealing structure disposed between the high pressure storage vessel and the main body of the valve.

13. The interface according to claim 12, wherein at least a portion of the fuel leakage vent is formed in the main body of the valve.

14. The interface according to claim 12, further comprising a second sealing structure disposed between the high pressure storage vessel and the main body of the valve.

15. The interface according to claim 12, further comprising a first back-up sealing structure disposed adjacent the first sealing structure and a second back-up sealing structure disposed adjacent the second sealing structure.

* * * * *